United States Patent
Jawaharlal et al.

(10) Patent No.: US 10,944,569 B2
(45) Date of Patent: Mar. 9, 2021

(54) COMPARISON AND VALIDATION OF DIGITAL CONTENT USING CONTEXTUAL ANALYSIS

(71) Applicant: International Business Machines Corporation, Armonk, NY (US)

(72) Inventors: Samuel Mathew Jawaharlal, Chennai (IN); Sathya Santhar, Ramapuram (IN); Sarbajit K. Rakshit, Kolkata (IN); Balamurugaramanathan Sivaramalingam, Paramakudi (IN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 16/195,961

(22) Filed: Nov. 20, 2018

(65) Prior Publication Data

US 2020/0162265 A1 May 21, 2020

(51) Int. Cl.
 *H04L 9/32* (2006.01)
 *H04L 12/58* (2006.01)
 *H04L 29/06* (2006.01)

(52) U.S. Cl.
 CPC ............ *H04L 9/3242* (2013.01); *H04L 51/30* (2013.01); *H04L 63/0428* (2013.01)

(58) Field of Classification Search
 CPC .... H04L 9/3242; H04L 51/30; H04L 63/0428
 See application file for complete search history.

(56) References Cited

U.S. PATENT DOCUMENTS

| | | | |
|---|---|---|---|
| 8,386,511 B2 | 2/2013 | Schneider | |
| 9,065,842 B2 * | 6/2015 | Vandervort | H04L 9/3247 |
| 9,292,495 B2 | 3/2016 | Bostick | |
| 9,363,084 B2 | 6/2016 | Logan | |
| 9,633,062 B1 * | 4/2017 | Vollmer | G06F 40/186 |
| 2005/0129269 A1 | 6/2005 | Lin | |
| 2005/0198169 A1 * | 9/2005 | Holten | H04L 63/104 |
| | | | 709/206 |
| 2005/0262428 A1 | 11/2005 | Little | |
| 2006/0036865 A1 * | 2/2006 | Brown | H04L 9/3236 |
| | | | 713/181 |
| 2014/0372478 A1 | 12/2014 | Zhao | |
| 2015/0081681 A1 | 3/2015 | Vohra | |
| 2017/0214649 A1 | 7/2017 | Tomkow | |

OTHER PUBLICATIONS

"Natural Language Classifier", Watson, downloaded from the internet on Sep. 11, 2018, <https://www.ibm.com/watson/services/natural-language-classifier/>, 8 pages.

"Natural Language Understanding", Watson, downloaded from the Internet Sep. 11, 2018, <https://www.ibm.com/watson/services/natural-language-understanding/>, 8 pages.

(Continued)

*Primary Examiner* — Hee K Song
(74) *Attorney, Agent, or Firm* — David B. Woycechowsky (57) ABSTRACT

Technology for matching "consequential-meaning hash key values" based on a sender-side text message and a corresponding receiver-side text message. In some embodiments, the hash key values will be based on a breakdown of the text into certain selected parts-of-speech categories.

15 Claims, 6 Drawing Sheets

400

```
Message text: I am happy today because I received three
shillings from a debtor, the ABC Company. I plan to spend
it on a nice hot chocolate beverage because it is truly
only 32 degrees F this evening.

Consequential meaning template:
(1) proper nouns: I, I, ABC Company, I;
(2) other nouns: today, debtor, beverage, evening;
(3) pronouns: it, it;
(4) adjectives: happy, nice, hot, chocolate;
(5) transitive verbs: received, plan, to spend;
(6) intransitive verbs: am, is;
(7) parameter values: three shillings, 32 degrees F;
(8) adverbs: truly Hash Key: 1IIAcI 2TDBE 3II 4HNHC 5RPTs 6AI 73S32Df 8T
```

(56) References Cited

OTHER PUBLICATIONS

"Text Analysis & Mining Software", Wordstat, Provalis Research, downloaded from the Internet on Sep. 11, 2018, 5 pages, <https://provalisresearch.com/products/content-analysis-software/>.
Bird et al., "Natural Language Processing with Python", Analyzing Text with the Natural Language Toolkit, downloaded from the internet on Sep. 11, 2018, <https://www.nltk.org/book/>, 1 page.
Wiebe et al., "Creating Subjective and Objective Sentence Classifiers from Unannotated Texts", CICLing'05 Proceedings of the 6th international conference on Computational Linguistics and Intelligent Text Processing, pp. 486-497, Mexico City, Mexico—Feb. 13-19, 2005, Springer-Verlag Berlin, Heidelberg ©2005, doi>10.1007/978-3-540-30586-6_53.

* cited by examiner

COMPARISON AND VALIDATION OF DIGITAL CONTENT USING CONTEXTUAL ANALYSIS

BACKGROUND

The present invention relates generally to the field of contextual analysis performed by computers.

Digital communication is extensively being used to share information especially when the various stakeholders are geographically distributed. This kind of communication comes with the risk of: (i) a "man in the middle attack, (ii) a data transmission where content sent from the sender is lost, and/or (iii) a data transmission where content sent from the sender might be a different content altogether when it reaches the receiver. In order to help counter these kinds of alterations, it is known to: (i) generate hash keys based on the actual content of a communication on both the sender and receiver sides; (ii) to compare these actual content hash keys at the receiver side to determine a mismatch; and (iii) repeatedly request resending of the communication until the actual content hash keys do match. This currently conventional technology of actual content hash key comparison will be further discussed, below, in the Detailed Description section of this document.

SUMMARY

According to an aspect of the present invention, a method includes the following operations (not necessarily in the following order): (i) receiving, from a sender-side device, over a communication network and by a receiver-side device, a receiver-side message data set including the actual content of a message as received at the receiver-side device; (ii) receiving, from a sender-side device, over a communication network and by a receiver side device, a sender-side consequential-meaning hash key value corresponding to a hash value based on an extraction of terms in the actual content of the message into a sender-side consequential-meaning template; (iii) extracting, by the sender-side device, terms from the receiver-side message data set into a receiver-side consequential-meaning template; (iv) determining, by the sender-side device, a receiver side consequential-meaning hash key value based on the receiver-side consequential-meaning template; (v) comparing, by the sender-side device, the sender-side consequential-meaning hash key value with the receiver-side consequential-meaning hash key value to determine a mismatch; and (vi) responsive to the mismatch, requesting, by the receiver-side device, through the communication network and to the sender-side device, a request to resend the message.

DETAILED DESCRIPTION

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
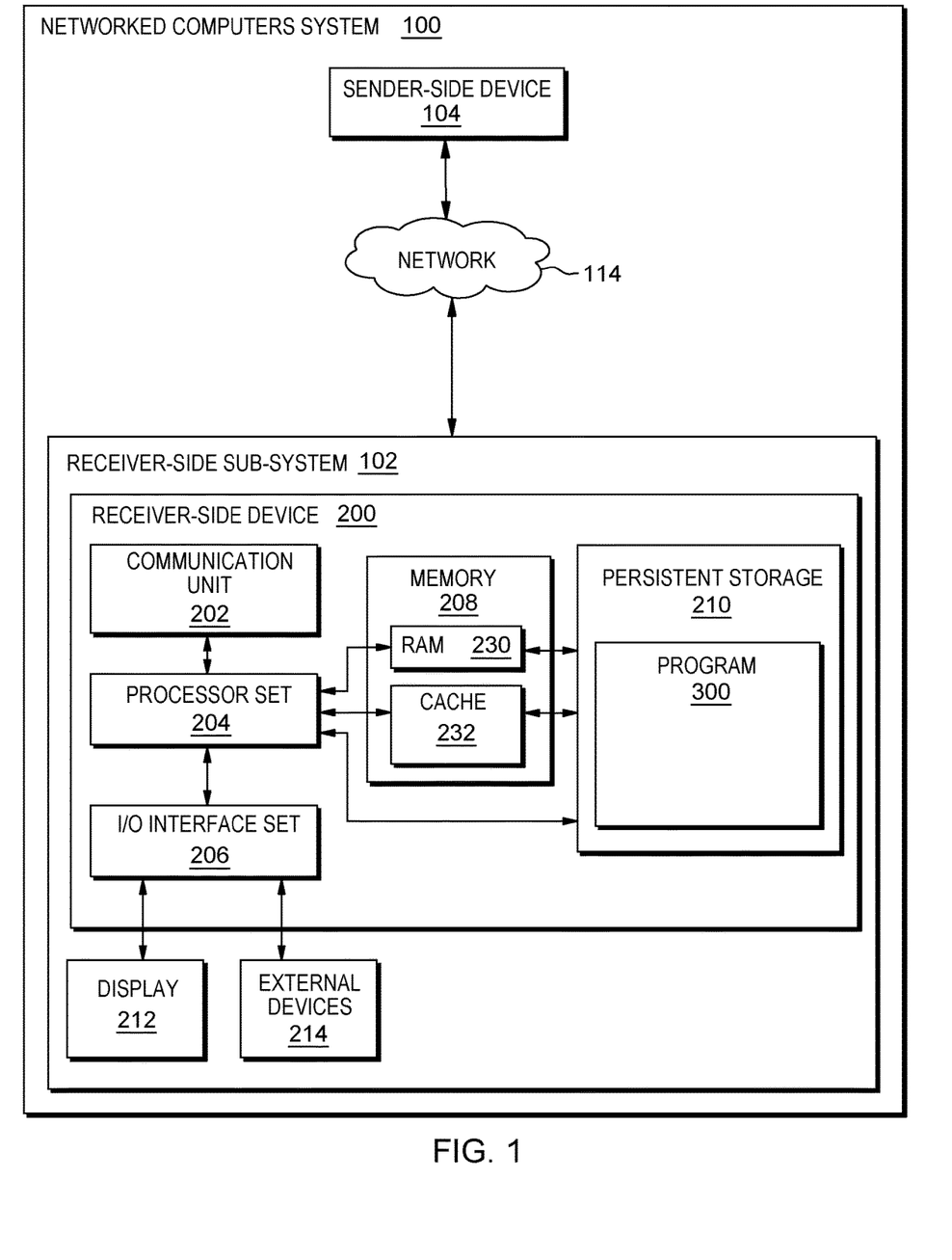
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: receiver sub-system 102 (also sometimes referred to as "receiver-side sub-system," or, more simply, sub-system); sender-side device 104; communication network 114; receiver device 200 (also sometimes referred to as "receiver-side device"); communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
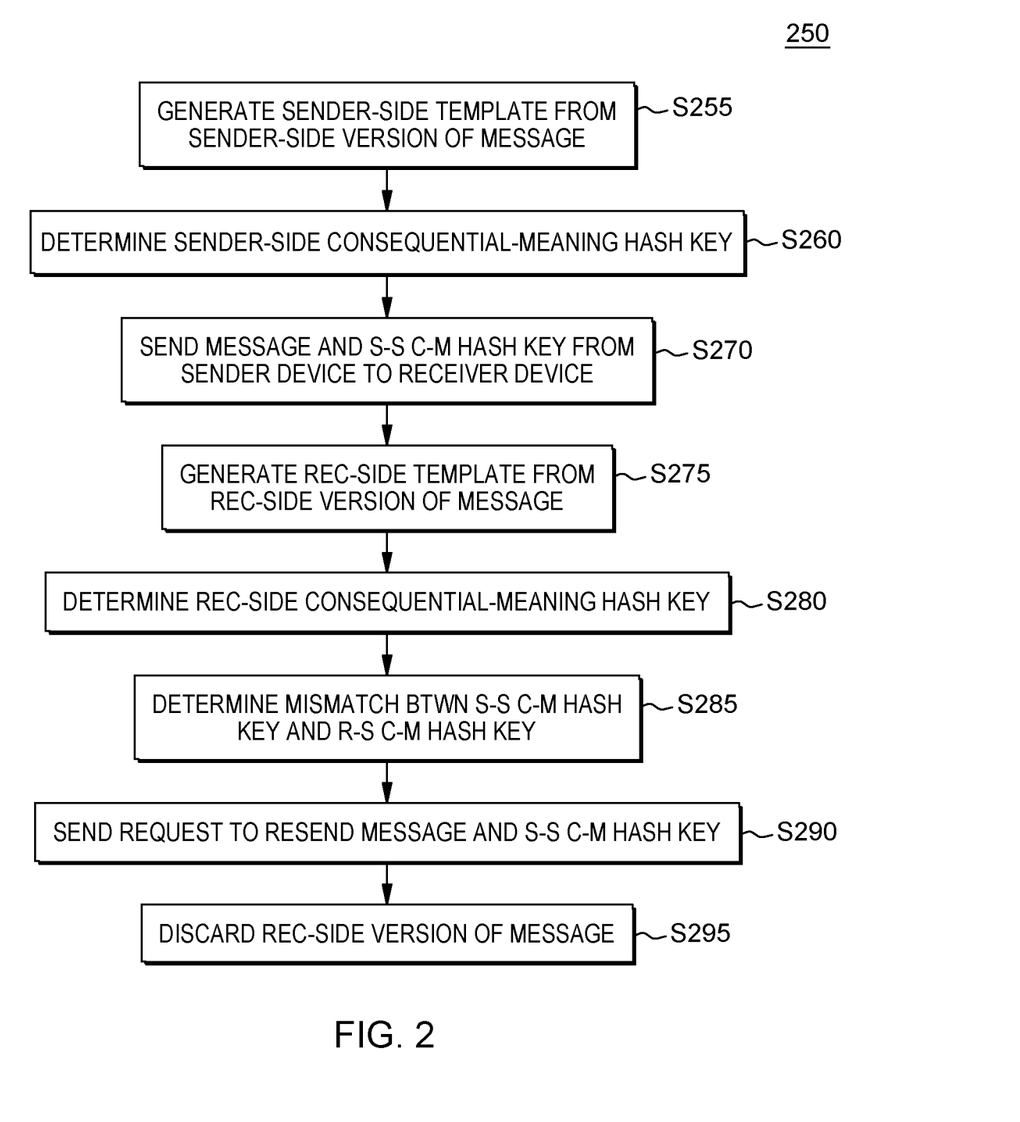
FIG. 2 is a flowchart showing a first embodiment method performed, at least in part, by the first embodiment system.
Figure 3:
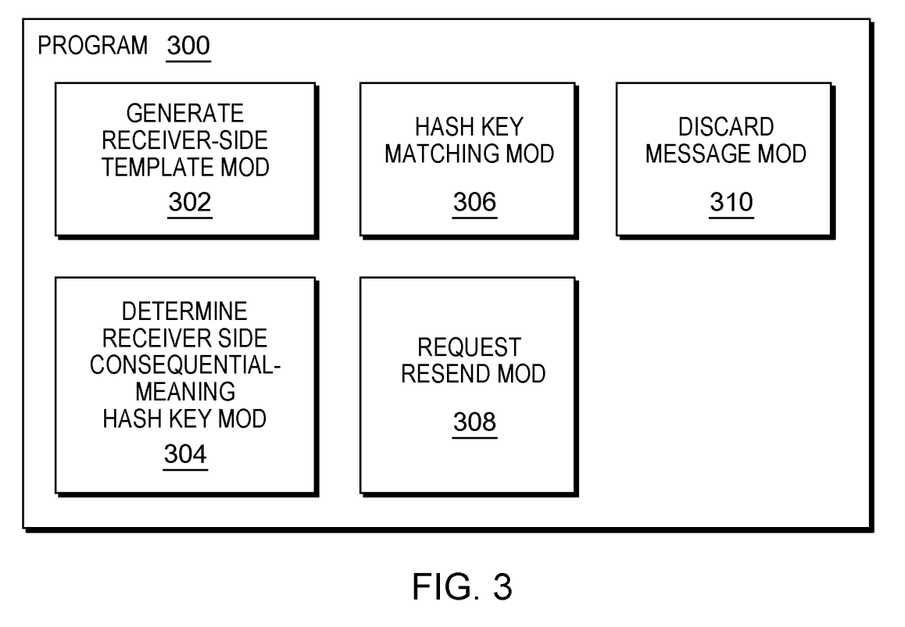
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where sender-side sub-system 104 (see FIG. 1) creates a sender-side consequential-meaning template for the text of a planned message to receiver device 102, as the text of the planned message exists at the sender-side device before it is sent through the communication network and thereby subject to data loss and/or data tampering. The process of making a consequential-meaning template will be discussed further below in connection with operation S275.

Processing proceeds to operation S260, where sender-side sub-system 104 (see FIG. 1) determines a sender-side consequential-meaning hash key value (sometimes herein simply referred to as a hash key) for the sender-side consequential-meaning template created at operation S255. The process of determining a hash key value based on a template will be discussed further below in connection with operation S280. In some embodiments, and as will be further discussed below in the following sub-section of this detailed description section, an actual content hash value (dependent upon all of the text and formatting of the message instead of only the important words) can also be calculated.

Processing proceeds to operation S270, where sender-side sub-system 104 (see FIG. 1) sends through communication network at to receiver device 200 at least the following: (i) the text based message; and (ii) the sender-side hash key value. When the text of the message is received by the receiver-side device, it is referred to as the "receiver-side version of the message." This is because the sending of the text of the message through the communication network subjects the text to various types of data loss (some of which is potentially problematic and some of which is potentially not problematic, as will be further discussed, below), so the sender-side and receiver side versions of the message must be distinguished (even though they will often turn out to be identical). In embodiments where an actual content hash value is calculated, then this value is sent as well.

Figure 4:
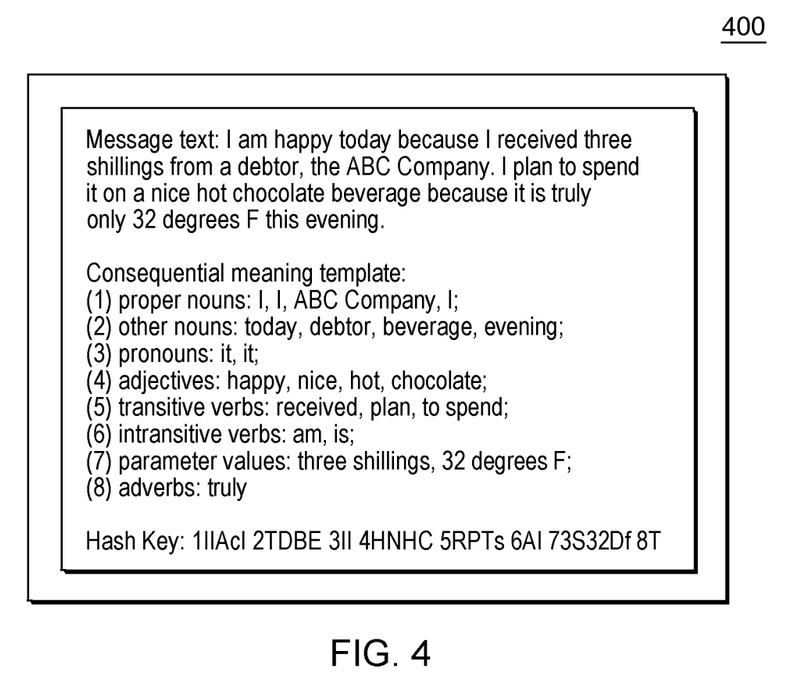
FIG. 4 is a screenshot view generated by the first embodiment system.

Processing proceeds to operation S275, where generate receiver-side template module ("mod") 302 of program 300 of receiver-side device 200 populates a receiver-side consequential-meaning template based on the text of the message as it is received at the receiver-side (which might be somewhat different than what was sent at the sender side). The purpose of the template is to isolate words and terms in the text of the message that are likely to have consequence as far as the meaning of the text of the message would be understood by human individuals. The receiver-side version of the text of an example message and a corresponding receiver-side consequential meaning template is shown in screenshot 400 of FIG. 4. As shown in screenshot 400, this embodiment of a template has eight fields, and each of them corresponds to a different part of speech (for example, transitive verb, intransitive verb). It is noted that some parts of speech are purposely not included in the template, such as articles and prepositions. This is because these kinds of words are not likely to significantly impact the meaning of the text message. It is also noted that some parts of the text message are parsed into multiple word phrases (for example, "three shillings"), but most are parsed on a word-by-word basis.

Processing proceeds to operation S280, where determine receiver-side consequential-meaning hash key mod 304 creates a receiver-side consequential-meaning hash key from the receiver-side consequential-meaning template. The receiver-side consequential-meaning template and a corresponding receiver-side consequential meaning hash key is shown in screenshot 400 of FIG. 4. In this example, the hash key has numerical values for the eight (8) "message classifier types" of the template, with each numerical value being followed by alphanumeric codes corresponding to the first letters of the words/terms respectively corresponding to the message classifier type. There are many other ways of deriving a hash value from a template (now known and to be developed in the future), as will be further discussed in the following sub-section of this detailed description section.

Processing proceeds to operation S285, where hash key matching mod 306 compares: (i) the sender-side consequential-meaning hash key value received from sender-side device 104; and (ii) the receiver-side consequential-meaning hash key value (see FIG. 4). In this example of flow chart 250, there is a mismatch. This indicates that the respective templates are different, which, in turn, indicates that some important words in the text of the message were probably lost and/or altered when the text of the message was communicated over the network from the sender side to the receiver side.

Processing proceeds to operation S290, where request resend mod 308 requests, form the receiver side, over the communication network and to the sender side (that is sender-side sub-system 104) to re-send the message. This is because the mismatch, previously determined at operation S285, indicates that important information, with respect to the consequential meaning of the message, was likely to have been lost during the previous transmission of operation S270. On the other hand, if only non-sequential information (for example, a preposition, a punctuation mark or a formatting attribute value) had been lost then the hash key values would match and there would be no request to re-send the message.

Processing proceeds to operation S295, where discard message mod 310 discards the receiver-side version of the text of the message previously received at S270. This is because the mismatch indicated that important information, with respect to the consequential meaning of the message, was likely to have been lost during the previous transmission of operation S270, and also because a new version of the message will soon be received due to the request for resend of operation S290.

III. Further Comments and/or Embodiments

Some embodiments of the present invention recognize the following facts, potential problems and/or potential areas for improvement with respect to the current state of the art: (i) even though the content of a data transmission may be modified during the transmission (for example, due to any of the reasons mentioned, above, in the Background section), at times, the contextual meaning might remain the same; (ii) there is no method/system to conform if the context is the same between what the sender has sent and what the receiver has received; and/or (iii) there is no method/system to help prevent multiple needless transactions between the sender and receiver where the context remains the same even though the content is modified during a data transmission.

Some embodiments of the present invention are directed to a system and method to perform the following operations (not necessarily in the following order) at the sender side of a digital communication: (i) extract the contextual information from the content that is planned to be sent over a communication channel from a sender-side device to a receiver-side device, (ii) use classifiers defined in a standardized template to populate the sender-side version of the contextual metadata, (iii) generate a sender-side actual content hash key (also called, digital signature) based on the actual content as the actual content exists in the sender-side device; (iv) generate a sender-side contextual metadata hash key (also called, digital signature) based on the contextual metadata as the contextual metadata exists in the sender-side device; and (v) send the actual content, the sender-side actual content hash key, the contextual metadata and the sender-side contextual metadata hash key from the sender-side device, over the communication channel and to the receiver-side device.

Some embodiments of the present invention are directed to a system and method to perform the following operations (not necessarily in the following order) at the receiver side of a digital communication: (i) receive, over the communication channel and from the sender-side device, the actual content (as transmitted version), the sender-side actual content hash key, the contextual metadata (as transmitted version) and the sender-side contextual metadata hash key; (ii) generate a receiver-side actual content hash key based on the actual content (as transmitted version; (iii) compare the sender-side actual content hash key and the receiver-side actual content hash key to determine that the actual content hash keys do not match (indicating that the actual content of the digital transmission was somehow modified during communication of the actual content over the communication channel from the sender-side device to the receiver-side device); (iv) responsive to the mismatch between the actual content hash keys, generate a receiver-side contextual hash key based on the contextual data (as transmitted version); (v) compare the sender-side contextual metadata hash key and the receiver-side contextual metadata hash key to determine that these hash keys match; (vi) responsive to the determination that the contextual metadata hash keys match, maintain the message (that is, do not discard the actual content) even if there is a bit loss or bit change in the actual content (for example, a change in actual content caused by an intruder) because the contextual metadata does still match.

In case of images included in the actual content of the data transmission from the sender-side device, over the communication channel and to the sender-side device, separate hash keys can be generated for images (collectively or individually), and these actual image content hash keys compared at the receiver-side device before checking the contextual metadata hash keys (as described in the previous paragraph). "Contextual analysis," as that term is used herein, deals with extracting the values for the classifiers defined in the template, while ignoring irrelevant information, so that if such information changes, it is not considered as a loss of data.

Figure 5:
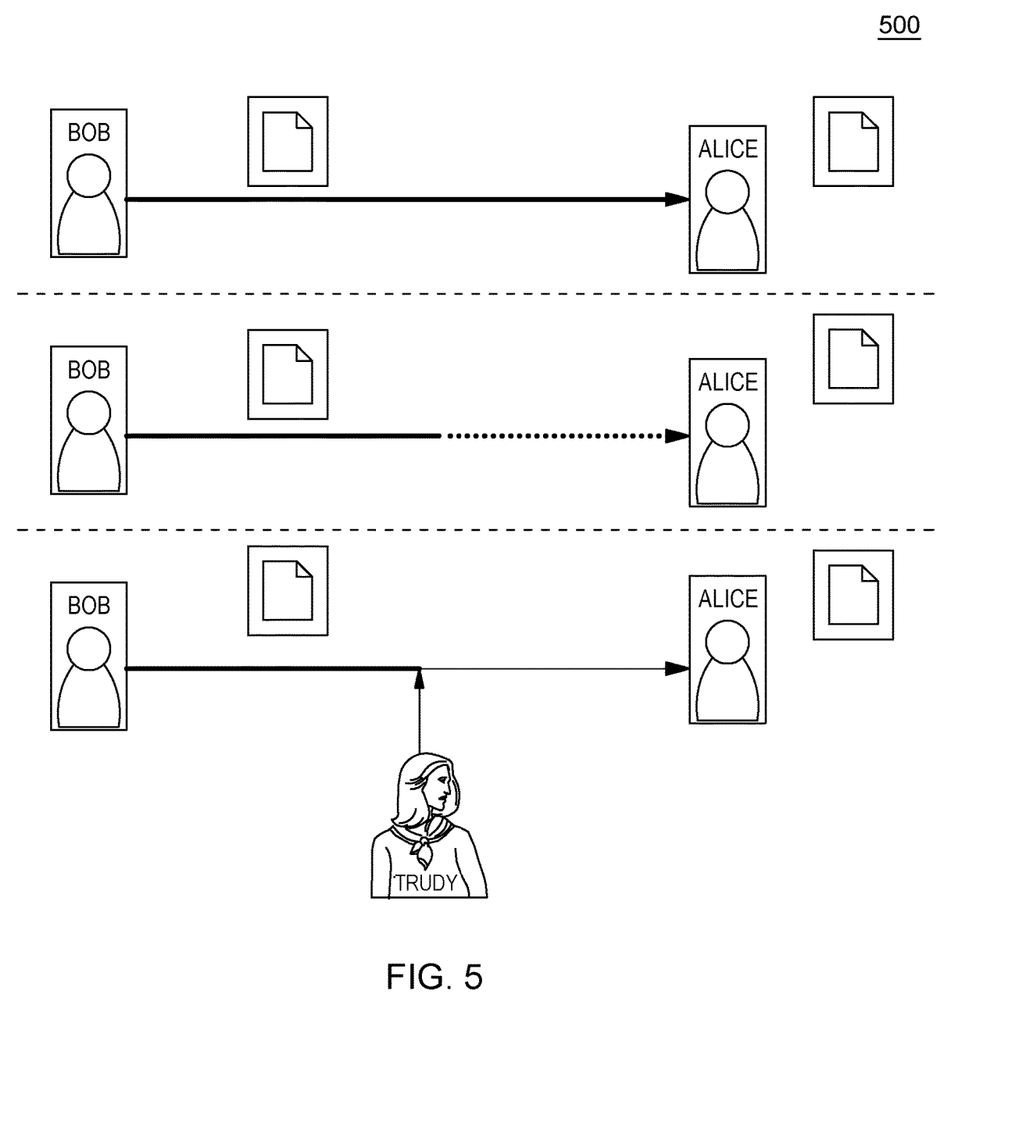
FIG. 5 is a diagram of various scenarios that can be handled by various embodiments of the present invention.

Diagram 500 of FIG. 5 will now be discussed. Consider the three scenarios (top, middle and bottom) of diagram 500. In each of these three scenarios, Bob is trying to send digital contents to Alice over a communication channel.

TOP SCENARIO: The message from Bob to Alice has suffered a non-deliberate data loss, but the data loss is inconsequential with respect to the meaning of the message. In these scenarios, the sender side message is an email message called Original Message M and the receiver side message is an email message called Message M1. The text of the M1 email is a bit different than the text of the email M because M1 has different line breaks, different formatting and a couple of small missed words relative to M. However, these differences do not affect the meaning of the email, which is to say that M and M1 will mean the same thing to a human reader. This is an example where the sender and receiver side hash keys for the actual content will not match, but the sender and receiver side hash keys for the contextual metadata will match. This leads to the result that email M1 is maintained and displayed to its intended recipient. Additionally, the recipient may be given a note that the message, M1, has been altered in ways that are believed to be inconsequential with respect to the meaning of the email text (for example, formatting differences).

MIDDLE SCENARIO: The message from Bob to Alice has suffered a non-deliberate data loss, but the data loss is consequential, meaning that the meaning of the message is changed, or lost, due to the data loss. The text of the M1 email has some missing names and other missing content that is important with respect to the meaning of the text. In the middle scenario, these differences do affect the meaning of the email, which is to say that M and M1 will not mean the same thing to a human reader. This is an example where the sender and receiver side hash keys for the actual content will not match, and the sender and receiver side hash keys for the contextual metadata also will not match. In this scenario, the email would be discarded in responsive to the lack of a match between sender side and receiver side contextual metadata keys. Alternatively, the recipient may be given a notification that the message, M1, has been altered in ways that are believed to be potentially consequential with respect to the meaning of the email text, so extreme caution should be used in dealing with email M1.

BOTTOM SCENARIO: The message from Bob to Alice has suffered a deliberate data alteration by intruder Trudy. As with the middle scenario, the metadata context keys will not match, and, in response, the message M1 is either discarded, or else a strongly worded notification of the alteration is provided to the human user.

Today, there are multiple cryptographic methods to ensure privacy/authenticity of the contents and Hash Key based techniques are one of those. For B's device to validate if the content received is the same sent by A's device, B's device (that is, the receiver-side device) generates a Hash value using a hash function like SHA-512 for the content received and compare it with the Hash Value sent by A's device (which is again generated for the content). These are both hash values corresponding to the actual content. If the Hash values don't match, then B's device would request A's device to resend content as there might have been a data loss during transmission or an intruder attack. B's device would continue to ask A's device as long as the Hash Keys doesn't match for any reason. Some embodiments of the present invention recognize that it can be frustrating for A's device to resend every time. Accordingly, some embodiments of the present invention use these actual content type hash keys but supplement them with generation and comparison of contextual metadata hash keys.

Figure 6:
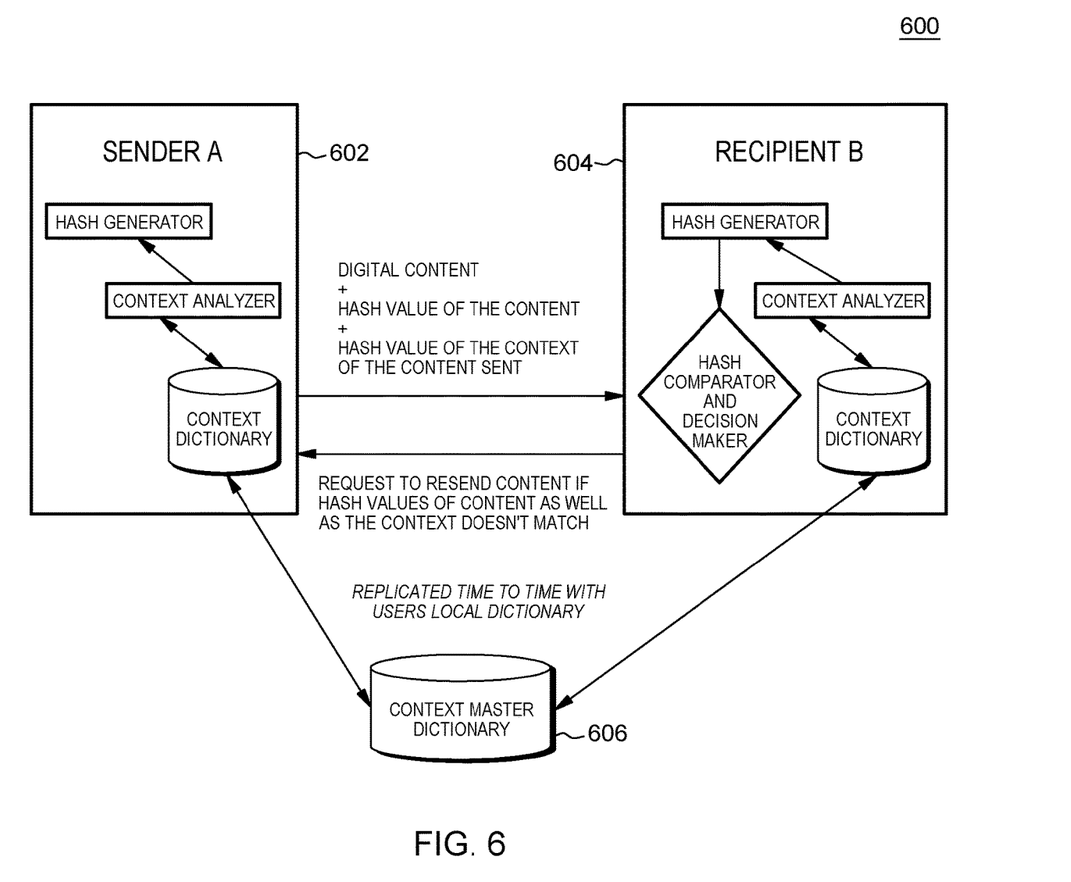
FIG. 6 is block diagram of a second embodiment of a system according to the present invention.

Block diagram 600 of FIG. 6 will now be discussed. Diagram 600 includes: sender A device 602; recipient B device 604 and master context dictionary 606. In diagram 600, both sender A device 602 and recipient B device 604: (i) generates hash for the actual content, and (ii) also generates context for the content shared and generates hash keys for the context (that is, the consequential meaning) as well.

An embodiment of a method performed by the system of diagram 600 includes the following operations: (i) Sender A device 602, before it sends the content to recipient B device 604, not only generates Hash for the content but generates the Hash for the Context of the Content as well; (ii) Context is generated using the Context Analyzer which again refers the Context dictionary (which might have Templates, Cognitive inputs) (for example, if the content is a mail message content, the context dictionary might contain certain parameters like names of persons (in To, Cc), technologies, dates, short hand interpretations other terminologies used in the mails, and the Context Analyzer would contain lexical/semantic analysis); (iii) Sender A device 602 then sends 3 parameters, the content+Hash Value of the Content+Hash value (again generated) for the Context of the Content to B; (iv) upon receiving the 3 parameters, Recipient B device 604 would then generate the Hash Value of the Content. If it matches, then: (i) Recipient B device 604 has got the content A intended to send; and (ii) Recipient B device 604 doesn't ask for contents to be resent or discard the contents; (v) instead Recipient B device 604 generates the context of the content using the Context Dictionary on B's end (Context Dictionaries for different users are inherited from Master Context Dictionary 606, which replicates with different local Context Dictionaries and hence the contextual content generated at each user's end would remain the same); and (vi) the Content analyzer uses a standard set of pre-defined classifiers (part of the Context Dictionary) and identifies values for each of the classifiers for the message content and establishes associations and flow of message to arrive at the context of the message.

Figure 7:
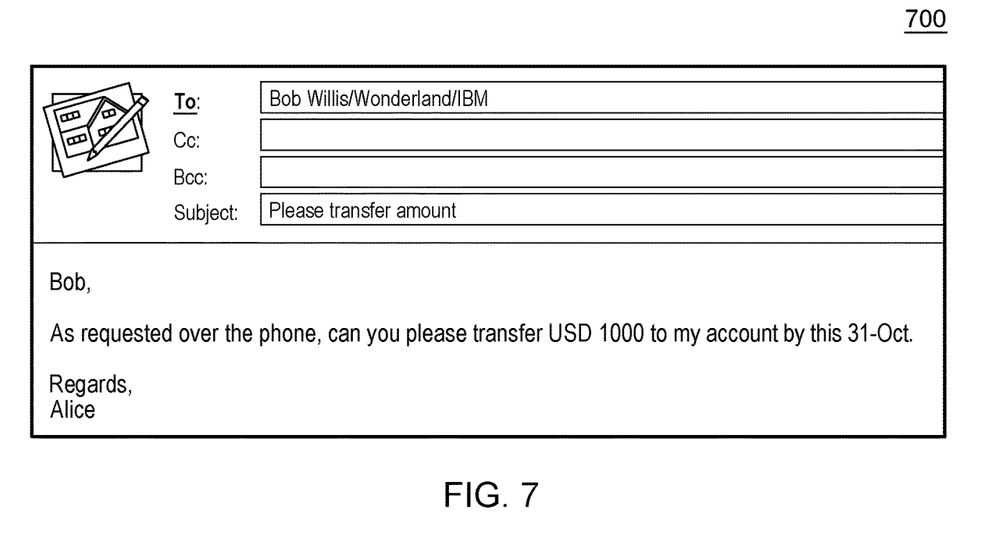
FIG. 7 is a screenshot view of an email that can be handled by the second embodiment system.

Consider a simple example of an email message (see screenshot 700 of FIG. 7), where contextual maps are generated (at the sender and receiver sides) to arrive at the context (at the sender and receiver sides, respectively). To extract the contextual metadata from the email message of screenshot 700, values of the email message are identified and populated against all classifiers using the Context Analyzers (of Sender A device 602 and Recipient B device 604) and Master Context Dictionary 606, shown in diagram 600, resulting in Table 1 as follows:

| Message Classifier Types | Message Classifier Values |
| --- | --- |
| Subject(s) | Alice, Bob, Phone, Account |
| Action(s) | Requested, Discussed, Transfer |
| Topic(s) | Finance |
| Tone(s) | Request |
| Absolute(s) | USD 1000, 31 Oct. 2016 |
| Topic(s) | Finance |
| PlaceHolder | <<any ambiguous sentences>> |
| . . . | . . . , . . . |
| . . . | . . . |

The list of message classifier fields is sometimes herein referred to as a "meaning extraction template." Other embodiments may use different message classifiers depending upon the types of textual analysis to extract meaning that a given embodiment may be programmed to perform.

Figure 8:
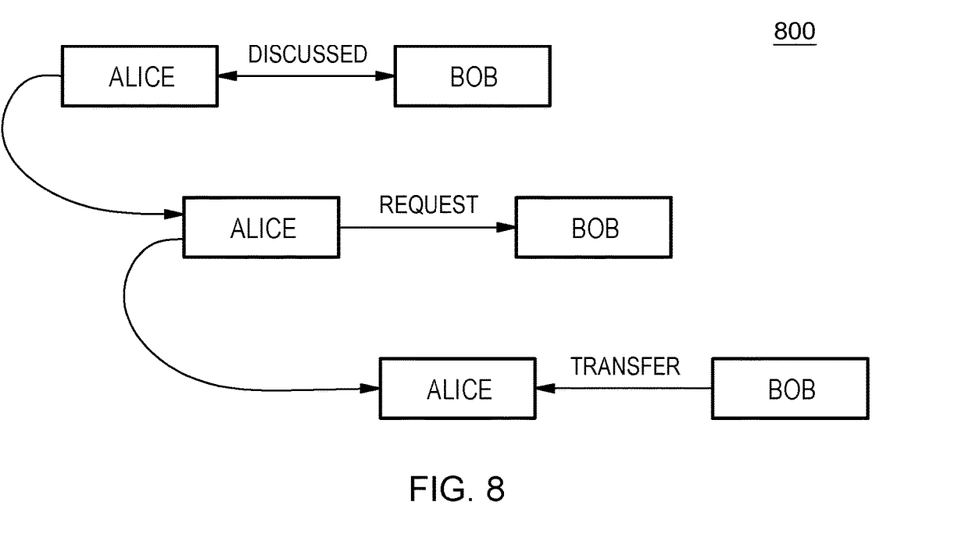
FIG. 8 is a diagram showing an example of communicative flow under an example of operations of the second embodiment system.

Diagram 800 of FIG. 8 will now be discussed. In diagram 800, a sample Context Map—Association between different Classifier Values establishes required flow according to an embodiment of the present invention. Hash of the context generated by B is then compared with the hash sent by A to B. If the hashes match, then there is no need for A to resend the content. On the other hand, if the hashes of the contextual content are different, then there has been significant loss/damage done to the data and hence B would request A to resend the content, and this would continue until the hash of the content and contextual content does match. A would send the message(M)+Hash of the original message H (M) and Hash of the context of message H (CM) to B. If the message is unaltered or altered but not contextually altered (identified by matching the contextual hash values of message received and Contextual Hash Value received from A) then the message received by B(Alice) is same what is sent by A (Bob). In the above example, Contextual Hash M and M1 are equal though the message content is not exactly the same (that is, H (CM)=H (CM1)), but same is not true with altered messages M2 and M3 as H (CM)≠H (CM2) and H (CM)≠H (CM3). In some embodiments, the scope of contextual metadata analysis is limited to analysis of text and does not include analysis of images (for example, still images, video).

Some embodiments of the present invention may include one, or more, of the following features, characteristics, advantages and/or operations: (i) extracting contextual information from a digital content and use classifiers defined in a standardized template to populate the metadata to be sent and received, over a communication channel, by generating digital signatures such as hash keys on the context of the content on the sender side and the receiver side; (ii) transmitting generated digital signatures of the actual content and the contextual metadata to the other side of the channel and comparing and validating the generated digital signatures of the actual content and the contextual content sent on the receiver side using a context master dictionary; and (iii) preventing multiple transaction/communication between the message sender and the receiver in order to determine or confirm correct transaction of the digital content, using validation of contextual information.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving, from a sender-side device, over a communication network and by a receiver-side device, a receiver-side message data set including the actual content of a message as received at the receiver-side device;
receiving, from a sender-side device, over a communication network and by a receiver side device, a sender-side consequential-meaning hash key value corresponding to a hash value based on an extraction of terms in the actual content of the message into a sender-side consequential-meaning template;
extracting, by the sender-side device, terms from the receiver-side message data set into a receiver-side consequential-meaning template;
determining, by the sender-side device, a receiver side consequential-meaning hash key value based on the receiver-side consequential-meaning template,
comparing, by the sender-side device, the sender-side consequential-meaning hash key value with the receiver-side consequential-meaning hash key value to determine a consequential meaning mismatch; and
responsive to the determination of the consequential meaning mismatch, requesting, by the receiver-side device, through the communication network and to the sender-side device, a request to resend the message.

2. The CIM of claim 1 further comprising:
receiving, from a sender-side device, over a communication network and by a receiver side device, a sender-side actual-content hash key value corresponding to a hash value based on an entirety of the actual content of the message.

3. The CIM of claim 2 further comprising:
determining, by the sender-side device, a receiver-side actual-content hash key value based on the receiver-side message data set; and
comparing, by the sender-side device, the sender-side actual-content hash key value with the receiver-side actual-content hash key value to determine an actual content mismatch;
wherein:
the determination of the receiver side consequential-meaning hash key value is performed in response to the determination of the actual content mismatch; and
the comparison of the sender-side consequential-meaning hash key value with the receiver-side consequential-meaning hash key value is performed in response to the determination of the actual content mismatch.

4. The CIM of claim 1 wherein:
the sender-side consequential-meaning template includes a plurality of message classifier types and respectively corresponding message classifier type value(s) for each message classifier type; and the receiver-side consequential-meaning template includes the plurality of message classifier types and respectively corresponding message classifier type value(s) for each message classifier type.

5. The CIM of claim 4 wherein the message classifier types include at least the following: subject(s), action(s), topic(s), tone(s) and absolute(s).

6. A computer program product (CPP) comprising:
a storage medium; and
computer code stored on the storage medium, the computer code including data and instructions for causing a processor(s) set to perform at least the following operations:
  receiving, from a sender-side device, over a communication network and by a receiver-side device, a receiver-side message data set including the actual content of a message as received at the receiver-side device,
  receiving, from a sender-side device, over a communication network and by a receiver side device, a sender-side consequential-meaning hash key value corresponding to a hash value based on an extraction of terms in the actual content of the message into a sender-side consequential-meaning template,
  extracting, by the sender-side device, terms from the receiver-side message data set into a receiver-side consequential-meaning template,
  determining, by the sender-side device, a receiver side consequential-meaning hash key value based on the receiver-side consequential-meaning template,
  comparing, by the sender-side device, the sender-side consequential-meaning hash key value with the receiver-side consequential-meaning hash key value to determine a consequential meaning mismatch, and
  responsive to the determination of the consequential meaning mismatch, requesting, by the receiver-side device, through the communication network and to the sender-side device, a request to resend the message.

7. The CPP of claim 6 wherein the computer code further includes data and instructions for causing the processor(s) set to perform the following operation(s):
  receiving, from a sender-side device, over a communication network and by a receiver side device, a sender-side actual-content hash key value corresponding to a hash value based on an entirety of the actual content of the message.

8. The CPP of claim 7 wherein the computer code further includes data and instructions for causing the processor(s) set to perform the following operation(s):
  determining, by the sender-side device, a receiver-side actual-content hash key value based on the receiver-side message data set; and
  comparing, by the sender-side device, the sender-side actual-content hash key value with the receiver-side actual-content hash key value to determine an actual content mismatch;
  wherein:
  the determination of the receiver side consequential-meaning hash key value is performed in response to the determination of the actual content mismatch; and
  the comparison of the sender-side consequential-meaning hash key value with the receiver-side consequential-meaning hash key value is performed in response to the determination of the actual content mismatch.

9. The CPP of claim 6 wherein:
the sender-side consequential-meaning template includes a plurality of message classifier types and respectively corresponding message classifier type value(s) for each message classifier type; and the receiver-side consequential-meaning template includes the plurality of message classifier types and respectively corresponding message classifier type value(s) for each message classifier type.

10. The CPP of claim 9 wherein the message classifier types include at least the following: subject(s), action(s), topic(s), tone(s) and absolute(s).

11. A computer system (CS) comprising:
a processor(s) set;
a storage medium; and
computer code stored on the storage medium, the computer code including data and instructions for causing the processor(s) set to perform at least the following operations:
  receiving, from a sender-side device, over a communication network and by a receiver-side device, a receiver-side message data set including the actual content of a message as received at the receiver-side device,
  receiving, from a sender-side device, over a communication network and by a receiver side device, a sender-side consequential-meaning hash key value corresponding to a hash value based on an extraction of terms in the actual content of the message into a sender-side consequential-meaning template,
  extracting, by the sender-side device, terms from the receiver-side message data set into a receiver-side consequential-meaning template,
  determining, by the sender-side device, a receiver side consequential-meaning hash key value based on the receiver-side consequential-meaning template,
  comparing, by the sender-side device, the sender-side consequential-meaning hash key value with the receiver-side consequential-meaning hash key value to determine a consequential meaning mismatch, and
  responsive to the determination of the consequential meaning mismatch, requesting, by the receiver-side device, through the communication network and to the sender-side device, a request to resend the message.

12. The CS of claim 11 wherein the computer code further includes data and instructions for causing the processor(s) set to perform the following operation(s):
  receiving, from a sender-side device, over a communication network and by a receiver side device, a sender-side actual-content hash key value corresponding to a hash value based on an entirety of the actual content of the message.

13. The CS of claim 12 wherein the computer code further includes data and instructions for causing the processor(s) set to perform the following operation(s):
  determining, by the sender-side device, a receiver-side actual-content hash key value based on the receiver-side message data set; and
  comparing, by the sender-side device, the sender-side actual-content hash key value with the receiver-side actual-content hash key value to determine an actual content mismatch;
  wherein:
  the determination of the receiver side consequential-meaning hash key value is performed in response to the determination of the actual content mismatch; and the comparison of the sender-side consequential-meaning hash key value with the receiver-side consequential-meaning hash key value is performed in response to the determination of the actual content mismatch.

14. The CS of claim 11 wherein:

the sender-side consequential-meaning template includes a plurality of message classifier types and respectively corresponding message classifier type value(s) for each message classifier type; and the receiver-side consequential-meaning template includes the plurality of message classifier types and respectively corresponding message classifier type value(s) for each message classifier type.

15. The CS of claim 14 wherein the message classifier types include at least the following: subject(s), action(s), topic(s), tone(s) and absolute(s).

\* \* \* \* \*